United States Patent

Hunt

(10) Patent No.: US 8,495,386 B2
(45) Date of Patent: Jul. 23, 2013

(54) ENCRYPTION OF MEMORY DEVICE WITH WEAR LEVELING

(75) Inventor: Simon Hunt, Naples, FL (US)

(73) Assignee: McAfee, Inc., Santa Clara, CA (US)

(\*) Notice: Subject to any disclaimer, the term of this patent is extended or adjusted under 35 U.S.C. 154(b) by 155 days.

(21) Appl. No.: 13/079,889

(22) Filed: Apr. 5, 2011

(65) Prior Publication Data

US 2012/0260101 A1 Oct. 11, 2012

(51) Int. Cl.
*G06F 11/30* (2006.01)
*G06F 13/00* (2006.01)

(52) U.S. Cl.
USPC ............................ 713/189; 713/193; 711/163

(58) Field of Classification Search
USPC .............. 713/164–167, 172, 189, 193–194; 726/26–30; 711/100–105, 115, 154–156, 711/163–164, 170, 173
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 6,986,052 B1* | 1/2006 | Mittal | 713/190 |
| 7,096,504 B1* | 8/2006 | Tagawa et al. | 726/27 |
| 7,171,566 B2* | 1/2007 | Durrant | 713/189 |
| 7,506,155 B1 | 3/2009 | Stewart et al. | |
| 2003/0023867 A1* | 1/2003 | Thibadeau | 713/200 |
| 2003/0126458 A1* | 7/2003 | Teramoto et al. | 713/194 |
| 2004/0083335 A1 | 4/2004 | Gonzalez et al. | |
| 2005/0005149 A1* | 1/2005 | Hirota et al. | 713/193 |
| 2007/0256142 A1* | 11/2007 | Hartung et al. | 726/28 |
| 2008/0082835 A1* | 4/2008 | Asher et al. | 713/193 |
| 2009/0089590 A1 | 4/2009 | Challener et al. | |
| 2009/0164780 A1* | 6/2009 | Murayama et al. | 713/165 |
| 2010/0083005 A1* | 4/2010 | Ito et al. | 713/193 |
| 2010/0268864 A1* | 10/2010 | Ramiya Mothilal | 711/103 |
| 2011/0022853 A1* | 1/2011 | Donie et al. | 713/190 |

OTHER PUBLICATIONS

International Search Report and Written Opinion mailed Jul. 10, 2012 for International Application No. PCT/US2012/032330 filed Apr. 5, 2012.

\* cited by examiner

*Primary Examiner* — Darren B Schwartz (74) *Attorney, Agent, or Firm* — Patent Capital Group (57) ABSTRACT

Methods, systems, and apparatus, including computer programs encoded on a computer storage medium, for encryption of a memory device with wear leveling. In one aspect, a method includes accessing an address map of the memory device, the address map referencing first memory locations and second memory locations of the memory device, wherein the first memory locations store data that are to be encrypted by a full disk encryption operation on the memory device; designating the second memory locations as being encrypted without performing an encryption operation on the second memory locations; and encrypting only the data stored in the first memory locations of the memory device so that the data of the first memory locations and the second memory locations are designated as being disk encrypted.

20 Claims, 4 Drawing Sheets

ENCRYPTION OF MEMORY DEVICE WITH WEAR LEVELING

BACKGROUND

This specification relates to encryption.

Full disk encryption is a technique that encrypts all the data on a hard disk drive. With most file systems, deleting data from a hard disk drive does not actually eliminate the data from the hard disk drive. Instead, the memory locations occupied by the data are marked as unused while the actual data remains. Thus, full disk encryption techniques encrypt both the used and unused portions of hard disk drives to ensure that no data is left unencrypted.

Writing data to a hard drive is a relatively non-destructive process with respect to the physical storage medium, i.e., data can be written a very large number of times to the memory locations of a hard drive without degradation of the storage medium. However, some types of computer storage devices have relatively limited life span in terms of read and write operations relative to hard disk drives. Solid-state drives and USB flash drives are examples of erasable computer storage devices in which the memory cells eventually wear out from repeated programming and erasure. To extend the overall life of such a memory device, the addressable sections of the memory device, such as blocks or pages, can be programmed and/or erased at similar rates by wear leveling. Wear leveling ensures that the memory cells of the memory device wear evenly, e.g., programming and/or erasing of memory cells occurs at a similar rate for all the memory cells over the life of the memory device.

Because full disk encryption encrypts both the used and unused portions of a memory device to ensure that no data is unencrypted, a full disk encryption prematurely ages a solid-state drive and premature expands a wear leveling table that is used for wear leveling operations. This can unnecessarily shorten the life of the storage device and degrade read and write access times.

SUMMARY

In general, one innovative aspect of the subject matter described in this specification can be embodied in methods that include the actions of accessing, by a computer, an address map of a memory device, the address map referencing first memory locations and second memory locations of the memory device, wherein the first memory locations store data that are to be encrypted by a full disk encryption operation on the memory device; designating, by the computer, the second memory locations as being encrypted without performing an encryption operation on the second memory locations; and encrypting, by the computer, only the data stored in the first memory locations of the memory device so that the data of the first memory locations and the second memory locations are designated as being disk encrypted. Other embodiments of this aspect include corresponding systems, apparatus, and computer programs, configured to perform the actions of the methods, encoded on computer storage devices.

Particular embodiments of the subject matter described in this specification can be implemented to realize one or more of the following advantages. By not encrypting empty memory locations, programming of the locations is avoided, thereby reducing the number of read and write cycles on the locations, and further avoiding unnecessary expansion of wear tables. This can also lead to increased performance for read and write times relative to solid-state memory devices in which every location has been programmed by a full disk encryption, as the wear tables are not unnecessarily expanded in complexity.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
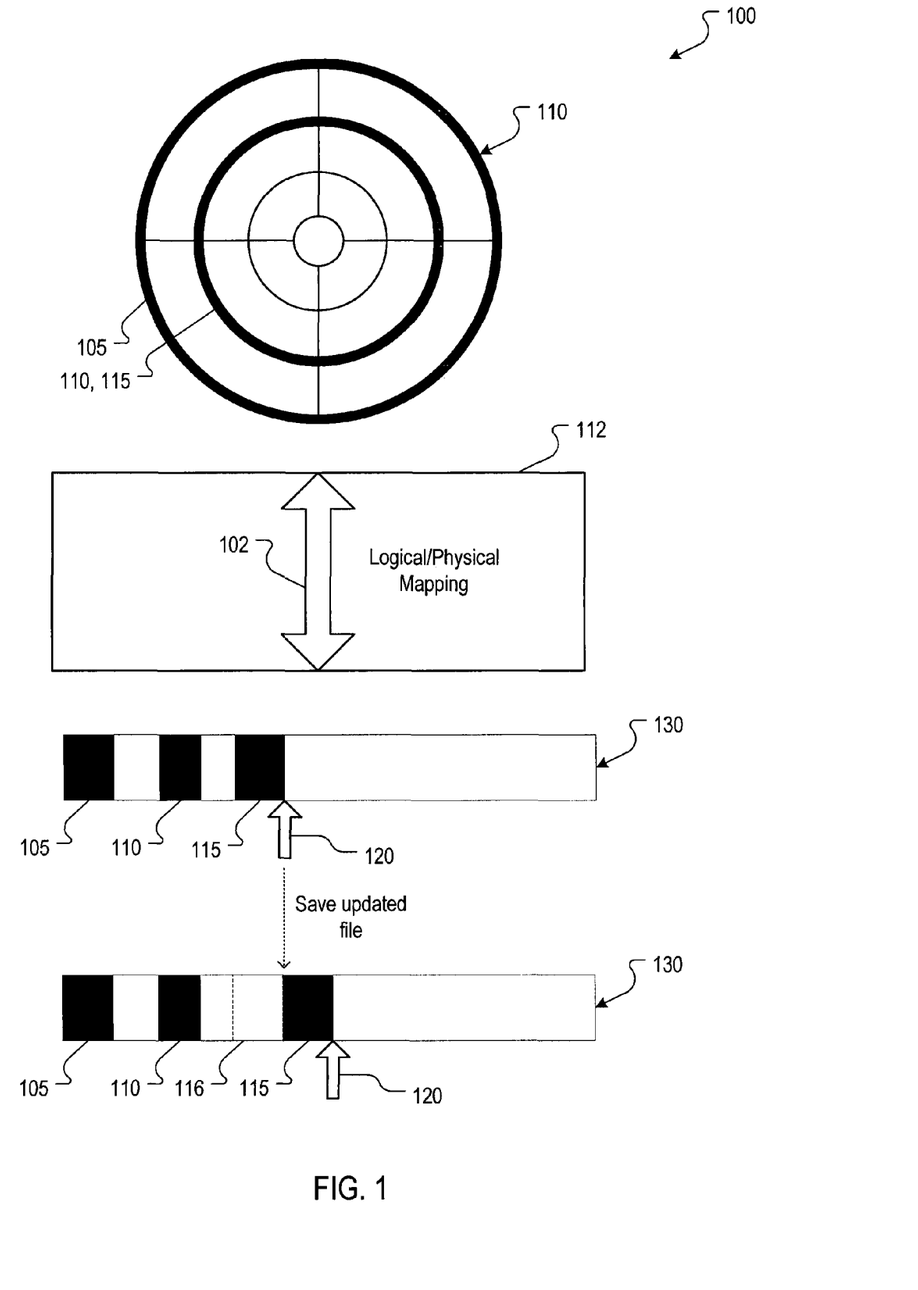
FIG. 1 is a block diagram of an example mapping of logical memory addresses to physical memory addresses in a solid-state drive.

FIG. 1 is a block diagram of an example mapping of logical memory addresses to physical memory addresses in a solid-state drive memory device 130. The memory device 130 is composed of solid-state memory device, e.g., a Flash drive. A logical to physical mapping 102, such as a logical array, maps logical memory locations to physical locations in the memory device 130. For example, an operating system may be configured to access logical memory locations of a hard drive, e.g., the logical locations are addressed as a contiguous set of logical blocks, such as blocks of data of 512 bytes or 4,096 bytes, depending on the addressing scheme used. However, the memory device 130, which may be for example a NOR or NAND flash memory, implements a different addressing scheme due to the physical transistor array architecture of the memory device 130. Accordingly, the logical to physical mapping 102 maps the logical addresses of a hard disk façade 110 to the physical addresses of the memory device 130.

In many hard disk drive architectures, data, when stored, may be rewritten to the same location. As the magnetic medium of the hard disk drive can withstand many read and write cycles without damage as compared to the transistors of the memory device 130, wear leveling, in conjunction with the logical to physical mapping 102, is used to distribute programming and erasing operations evenly throughout the locations in the memory device 130. In general, wear leveling is any technique for extending the life of a solid-state memory device by evenly distributing write operations among physical memory locations within the memory device.

A simple wear leveling operation is reflected in the logical to physical mapping 102. For example, assume the memory device stores three files, represented by respective data 105, 110 and 115. For ease of illustration, the data are stored in contiguous locations defined by both the logical addresses and physical addresses. The data 105 for the first file is stored in a first set of contiguous logical memory locations, which correspond to a first set of contiguous physical memory locations in the memory device 130. The data 110 and 115 for the second and third files are stored in contiguous logical memory locations. However, the data 110 for the first file is stored in the first set of contiguous physical memory locations in the memory device 130, and the data 115 for the second file is stored in a second set of contiguous physical memory locations in the memory device 130.

A pointer 120 is used to point to the next location (e.g., memory location, memory block) in the memory device 130 that will be used to store data during a write operation. The pointer 120 and the mapping 102 is controlled by memory control logic 112 associated with the memory device 130. Both are used, in part, to accomplish wear leveling operations.

Assume that data for the second file are updated by the user, and the logical memory locations for the data of the second file 115 are not changed. However, the physical memory locations that are used to store the data 115 are changed. For example, assume the file is approximately 20 megabytes in size. The updated data 115 are written to the memory device 130 starting at the location of the pointer 120 in the upper figure of the memory device 130. At the end of the write operation, the pointer 120 has advanced by the amount necessary to store the 20 MB of data 115 relative to the previous location of the pointer, and the modified data 115 formerly stored in the memory locations indicated by the phantom block 116 are now saved in the locations in the range between the end of the phantom block 116 and the pointer 120.

Another commonly used process and computer devices is full disk encryption. Full disk encryption encrypts all memory locations of a hard disk drive. In some full disk encryption techniques, the master boot record is left unencrypted; however, some other full disk encryption techniques can also encrypt the master boot record. In an actual hard disk drive, when a file is deleted, the actual underlying data are still stored in the memory locations on the hard disk drive. Accordingly, full disk encryption is used to prohibit access to both data stored in files that have not been erased, and portions of data for deleted files and other data stored on a hard disk drive.

Because full disk encryption encrypts the entire hard disk, using full disk encryption results in each location defined by a logical address being written to with encrypted data. This entire encryption of the logical hard drive 140 thus results in the mapping to and usage of nearly all of the memory locations of the memory device 130. This can drastically increase the number of programming cycles that each memory location in the memory device 130 undergoes, thus prematurely aging the memory device 130, and/or advancing the logical to physical mapping 130 to an advanced state that may degrade performance with respect to read and write operation times.

In some implementations, the memory device 130 may implement a "flushing" operation that erases residual data in the original locations when the data are stored in other locations in the memory device. For example, the memory locations that originally stored the data 115, as indicated by the phantom block 116, are erased after the data 115 are saved to the new locations. Accordingly, the memory locations indicated by the phantom block 116 are empty (e.g., all values are logic 0 or all values are logic 1) after the data 115 are saved. Accordingly, there is no practical need to encrypt data of the actual physical memory locations of the device 130 in which data are not stored. Therefore, the device logic 112 can implement a wear leveling technique that reduces the amount of programming operations on the memory device 130 during a full disk encryption process.

In other implementations, the memory device 130 may not implement a flushing operation. Accordingly, residual data may be retained in some of the memory locations. However, as these physical memory locations are no longer logically mapped as logical locations in which data are stored, the risk of compromise is relatively small. Thus, encrypting data of the actual physical memory locations of the device 130 storing residual data can also be skipped. Once again, the device logic 112 can implement a wear leveling technique that reduces the amount of programming operations on the memory device 130 during a full disk encryption process.

Figure 2:
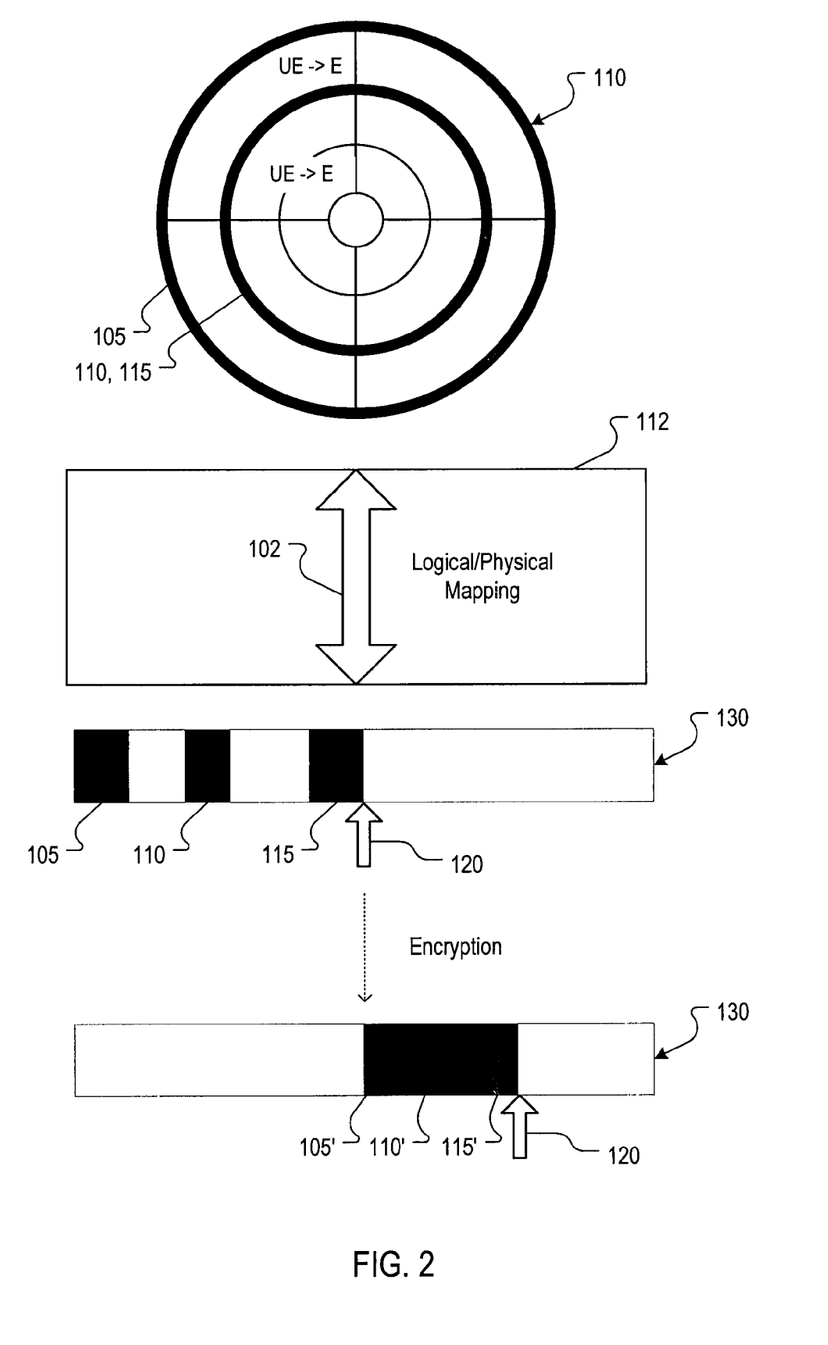
FIG. 2 is a block diagram of an example of encrypting a memory device implementing wear leveling.

FIG. 2 is a block diagram of an example of encrypting a memory device implementing wear leveling. As previously described, full disk encryption encrypts an entire hard disk to safeguard all of the data on the hard disk. However, unlike a hard disk, the memory device does not store data in the locations other than the locations used for storing data 105, 110 and 115 (or, alternately, the data stored in these other locations is not logically mapped to logical locations storing data). Thus, the memory device 130 need only have the data 105, 110 and 115 encrypted to substantially achieve the goal of full disk encryption.

Figure 3:
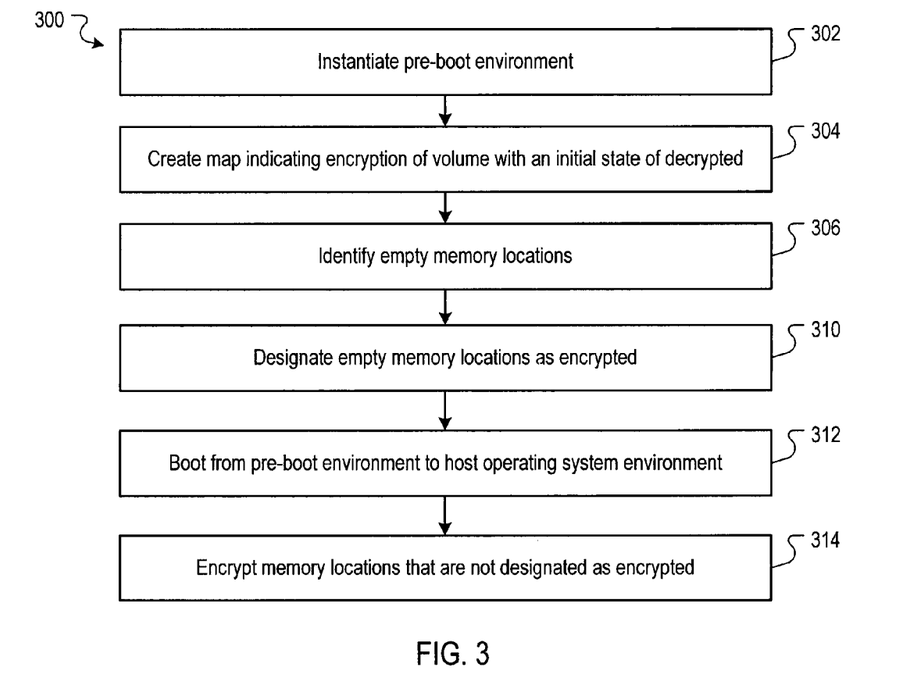
FIG. 3 is a flow diagram of an example process for encrypting data on a memory device with wear leveling.

One example process of encrypting the data 105, 110 and 115 on the memory device 130 is described with reference to FIG. 3, which is a flow diagram of an example process 300 for encrypting data on a memory device with wear leveling. The process can be implemented by software stored on the computer device. An example of limitation of FIG. 3, the process occurs in both the pre-boot and post-boot environment. As used herein, a pre-boot environment is an environment on a computer device prior to booting the main operating system.

The process 300 instantiates a pre-boot environment (302). For example, a program running on the computer may cause the operating system to reboot and set a flag that causes the computer to execute several of the following steps in the pre-boot environment.

The process 300 generates map indicating encryption of a volume with an initial state of decrypted (304). For example, the process 300 may access the logical to physical mapping 102 for the device 130 and designate all logical locations, and thus all physical locations, as being unencrypted.

The process 300 identifies empty memory locations (306). An empty memory location is a location that is available to store data. For example, process 300 may identify the logical locations of the disk façade 110 representation that are indicated as being un-allocated memory locations as empty memory locations. These logical locations correspond to the physical locations in the memory device 130 that are indicated as being available to store data (i.e., empty locations or locations in which data are still stored after the data are written to another location).

The process 300 designates the empty memory locations as being encrypted (310). For example, the logical locations that are designated as empty are also designated as encrypted, as indicated by the "UE→E" operation in the disk façade 110 representation of FIG. 2. The allocation may be detailed by each unused sector, or, in some implementations, may detail contiguous blocks of unused space by ranges that cover the unused blocks. The locations are designated as being encrypted without the execution of an actual encryption operation.

Because the unused ranges have no data stored in the memory locations to which they correspond, it is likely that the host operating system will not read them, or that data stored on them have no value (e.g., are empty locations or locations available for storage). By only indicating the ranges are encrypted, the host operating system encryption process does not encrypt these locations. This, in turn, prevents an increase in wear leveling tables and prevents unnecessary programming of the actual physical memory locations in the memory device 130.

The process 300 boots from the pre-boot environment to the host operating system environment (312). For example, after the process finishes identifying the empty memory locations in designating them as encrypted, the process 300 causes the computer device to boot into the host operating system.

The process 300 encrypts memory locations are not designated as encrypted (314). For example, the encryption process running on the host operating system accesses the map indicating the encryption of empty memory locations. Accordingly, these locations are not encrypted. Instead, the only locations that are encrypted are locations that are indicated as storing actual data. In the example of FIG. 2, the locations storing actual data are the logical memory locations corresponding to the storage of data 105, 110, and 115. During the encryption process, the data 105, 110, and 115, are encrypted to generate encrypted data 105', 110' and 115'.

The encrypted data are written from the location of the pointer 120. For example, assume the memory device 130 is a 100 GB solid-state drive, and the pointer was referencing a physical memory location at roughly a 50 GB location. Also assume that the data 105, 110, and 115 total 25 GB. As a result of the full disk encryption; the pointer will advance to the location of approximately 75 GB (i.e., advanced by 25 GB which corresponds to the size of the encrypted data 105', 110' and 115').

The above example was described with three contiguous blocks of data. In actuality, the pointer 120 may have cycled through all the memory locations 130 of the memory device one more times, resulting in partially fragmented files within the physical locations of the memory device 130. Regardless, the same process of creating a map that designates empty memory locations as encrypted applies when files are fragmented within the memory device 130. In such a situation, the encrypted data may not form a continuous block as shown in FIG. 2, but the expansion of the wear leveling table and unnecessary read and write operations on physical memory locations in the memory device 130 will still be reduced.

Figure 4:
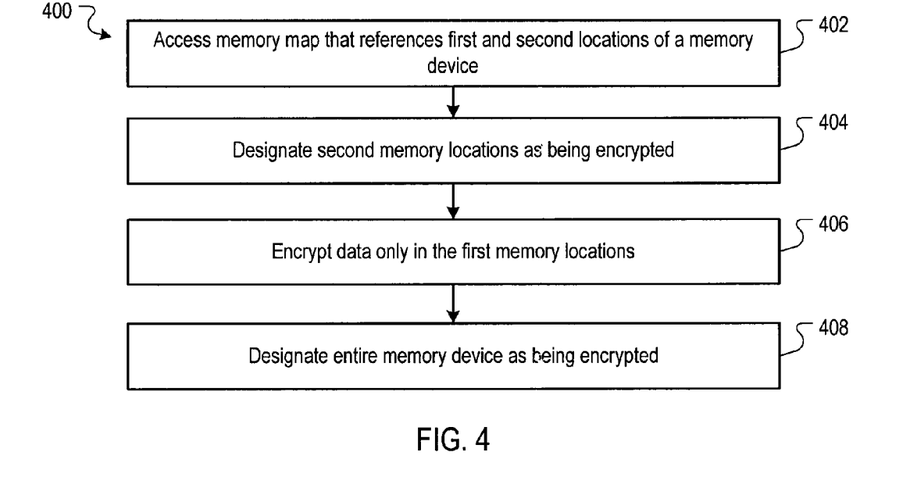
FIG. 4 is a flow diagram of another example process for encrypting data on a memory device with wear leveling.

FIG. 4 is a flow diagram of another example process 400 for encrypting data on a memory device with wear leveling. The process 400 differs from the process 300 in that that process 400 can, but need not, be partitioned among pre-boot and post-boot environments. For example, assume that the computer device implementing the process 400 is equipped with a solid-state drive. While the operating system and programs may implement addressing processes that rely on the disk façade 110 and the logical to physical mapping 102, data can be stored in the computer indicating that during a full disk encryption operation, the empty memory locations can automatically be designated as encrypted.

The process 400 accesses a memory map referencing first and second locations of a memory device (402). The first memory locations store data that are to be encrypted by a full disk encryption operation on the memory device, e.g., the first memory locations may correspond to the logical memory locations, and thus the physical memory locations, that are used to store the data 105, 110, and 115. The second memory locations correspond to memory locations that are available for write operations, e.g., empty memory locations in the memory device 130 or locations in the memory device 130 that store residual data.

The process 400 designates second memory locations as being encrypted (404). For example, the logical locations that are designated as empty are also designated as encrypted, as indicated by the "UE→E" operation in the disk façade 110 representation. The designation does not involve the use of an actual encryption operation.

The process 400 encrypts only the data stored in the first memory locations of the memory device (406). By doing so, the data of the first memory locations and the second memory locations are designated as being disk encrypted.

The process 400 designates the entire memory device as being encrypted (408). For example, the process 400 designates the entire memory device 130 is being encrypted, thereby completing a full disk encryption operation.

Afterwards, data can be read from the memory device 130, and decrypted in random access memory is part of normal operation. Likewise, the data can be encrypted in random access memory before writing to the memory device 130.

Figure 5:
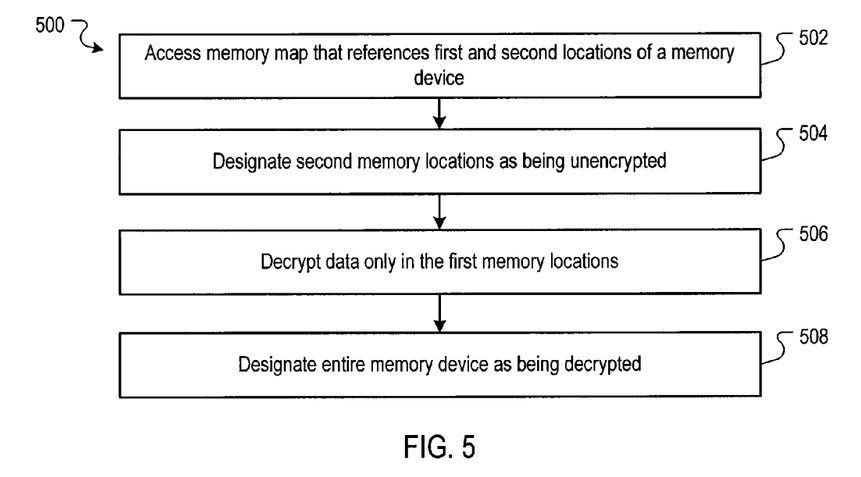
FIG. 5 is a flow diagram of an example process for decrypting data on a memory device with wear leveling.

FIG. 5 is a flow diagram of an example process 500 for decrypting data on a memory device with wear leveling. The process 500 has the same objective as the processes 300 and 400, i.e., reducing the expansion of wear leveling tables and reducing the number of unnecessary programming operations of the physical locations of the memory device 130.

The process 500 accesses a memory map referencing first and second locations of the memory device (502). The first memory locations store data that are to be decrypted by a full disk decryption operation on the memory device, e.g., the first memory locations may correspond to the logical memory locations, and thus the physical memory locations that are used to store the encrypted data 105', 110', and 115' of FIG. 2. The second memory locations correspond to memory locations that are available for write operations, e.g., empty memory locations in the memory device 130.

The process 500 designates second memory locations as being unencrypted (504). For example, the logical locations that are designated as empty are also designated as encrypted.

The process 500 decrypts data only in the first memory locations (506), and then designates the entire memory devices being decrypted (508).

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Figure 6:
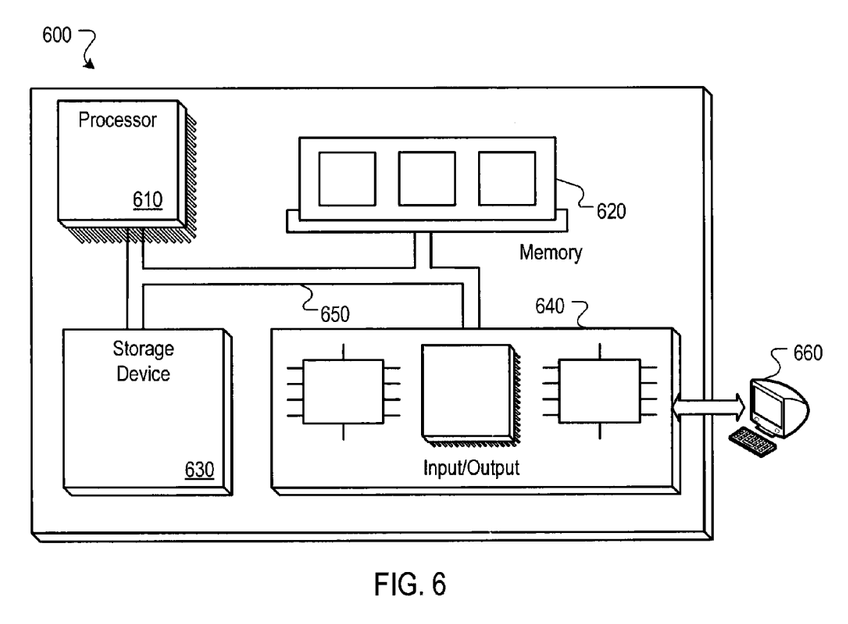
FIG. 6 is a block diagram of an example computer system that can be used to implement the processes and systems described with respect to FIGS. 1-5 above.

One example computer system is shown in FIG. 6, which is a block diagram of an example computer system 600 that can be used to implement the processes and systems described with respect to FIGS. 1-5 above. The system 600 includes a processor 610, a memory 620, a storage device 630, and an input/output device 640. Each of the components 610, 620, 630, and 640 can, for example, be interconnected using a system bus 650. The processor 610 is capable of processing instructions for execution within the system 600. The processor 610 is capable of processing instructions stored in the memory 620 or on the storage device 630.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 can, for example, include a hard disk device, an optical disk device, a solid-state drive, and/or other large capacity storage devices.

The input/output device 640 provides input/output operations for the system 600. In one implementation, the input/output device 640 can include one or more of a network interface device, e.g., an Ethernet card, a serial communication device, e.g., and RS-232 port, and/or a wireless interface device, e.g., an 802.11 card. In another implementation, the input/output device can include driver devices configured to receive input data and send output data to other input/output devices, e.g., keyboard, printer and display devices 660.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by a data processing apparatus, the method comprising:

accessing, by a computer, an address map of a memory device, the address map referencing first memory locations and second memory locations of the memory device, wherein the first memory locations store data that are to be encrypted by a full disk encryption operation on the memory device;

designating, by the computer, the second memory locations as being encrypted without performing an encryption operation on the second memory locations, wherein the second memory locations comprise empty memory locations; and encrypting, by the computer, only the data stored in memory locations of the memory device not already designated as encrypted, wherein the data of the first memory locations and the second memory locations are designated as being disk encrypted following the encrypting.

2. The method of claim 1, wherein designating the second memory locations as being encrypted comprises:
   determining one or more sets of contiguous second memory locations;
   for each set of contiguous second memory locations:
      determining a corresponding location range, the corresponding location range specifying a beginning logical address and an ending logical address; and
      designating the corresponding location range as being encrypted.

3. The method of claim 1, wherein the address map of the memory device represents logical addresses of a disk drive.

4. The method of claim 1, wherein the memory device is a solid-state memory device, and the address map maps logical addresses to physical addresses of the memory device.

5. The method of claim 4, wherein the solid-state memory device is a flash memory device.

6. The method of claim 1, wherein the data stored in memory locations of the memory device not already designated as encrypted are to be encrypted using a non-expansive encryption process.

7. The method of claim 1, further comprising:
   accessing, by the computer, a logical addresses map of a memory device, after encrypting the data;
   designating, by the computer, the second memory locations as being decrypted; and
   decrypting, by the computer, only the data stored in the first memory locations of the memory device so that the data of the first memory locations and the second memory locations are designated as being decrypted.

8. The method of claim 1, wherein:
   designating the second memory locations as being encrypted comprised designating from a pre-boot environment the second memory locations as being encrypted; and
   encrypting only the data stored in the first memory locations of the memory device comprises encrypting from a host operating system environment only the data stored in the first memory locations of the memory device.

9. The method of claim 1, wherein:
   accessing the address map comprises accessing a logical address map of the memory device, the logical address map referencing the first memory locations and second memory locations of the memory device by logical addresses, and wherein the first and second memory locations correspond to physical memory locations that are addressed by physical addresses that are mapped to the logical addresses in a mapping table; and
   designating the second memory locations as being encrypted comprises designating the logical addresses corresponding to the second memory locations as being encrypted.

10. A system, comprising:
a data processing apparatus;
a memory device;
instructions stored in a computer readable medium, the instructions being executable to cause the data processing apparatus to perform operations comprising:
   accessing an address map of the memory device, the address map referencing first memory locations and second memory locations of the memory device,
   wherein the first memory locations store data that are to be encrypted by a full disk encryption operation on the memory device;
   designating the second memory locations as being encrypted without performing an encryption operation on the second memory locations, wherein the second memory locations comprise empty memory locations; and
   encrypting only the data stored in memory locations of the memory device not already designated as encrypted, wherein the data of the first memory locations and the second memory locations are designated as being disk encrypted following the encrypting.

11. The system of claim 10, wherein designating the second memory locations as being encrypted comprises:
   determining one or more sets of contiguous second memory locations;
   for each set of contiguous second memory locations:
      determining a corresponding location range, the corresponding location range specifying a beginning logical address and an ending logical address; and
   designating the corresponding location range as being encrypted.

12. The system of claim 10, wherein the address map of the memory device represents logical addresses of a disk drive.

13. The system of claim 10, wherein the memory device is a solid-state memory device, and the address map maps logical addresses to physical addresses of the memory device.

14. The system of claim 13, wherein the solid-state memory device is a flash memory device.

15. The system of claim 10, wherein the data stored in memory locations of the memory device not already designated as encrypted are to be encrypted using a non-expansive encryption process.

16. The system of claim 10, wherein the instructions further comprise the data processing apparatus to perform operations comprising:
   accessing a logical addresses map of a memory device, after encrypting the data;
   designating the second memory locations as being decrypted; and
   decrypting only the data stored in the first memory locations of the memory device so that the data of the first memory locations and the second memory locations are designated as being decrypted.

17. The system of claim 10, wherein:
   designating the second memory locations as being encrypted comprised designating from a pre-boot environment the second memory locations as being encrypted; and
   encrypting only the data stored in the first memory locations of the memory device comprises encrypting from a host operating system environment only the data stored in the first memory locations of the memory device.

18. The system of claim 10, wherein:

accessing the address map comprises accessing a logical address map of the memory device, the logical address map referencing the first memory locations and second memory locations of the memory device by logical addresses, and wherein the first and second memory locations correspond to physical memory locations that are addressed by physical addresses that are mapped to the logical addresses in a mapping table; and designating the second memory locations as being encrypted comprises designating the logical addresses corresponding to the second memory locations as being encrypted.

19. At least one non-transitory machine accessible storage medium having instructions stored thereon, the instructions when executed on a machine, cause the machine to:

access an address map of a memory device, the address map referencing first memory locations and second memory locations of the memory device;

determine that data at the second memory locations is to be left unencrypted by a full disk encryption operation on the memory device, wherein the full disk encryption operation is to encrypt data stored at the first memory locations and the second memory location comprise empty memory locations;

designate the second memory locations as being encrypted; and encrypt only the data stored in memory locations of the memory device not already designated as encrypted, wherein the encrypting encrypts data of the first memory locations and data of the first memory locations and the second memory locations are designated as being disk encrypted following the encrypting.

20. The storage medium of claim 19, wherein determining that data at the second memory locations is to be left unencrypted by a full disk encryption operation on the memory device includes identifying the second memory locations as empty memory locations.

\* \* \* \* \*